Dec. 22, 1964     K. WAGNER     3,162,240
PREPARATION OF HIGHLY PURIFIED FORMALDEHYDE
Filed May 17, 1961
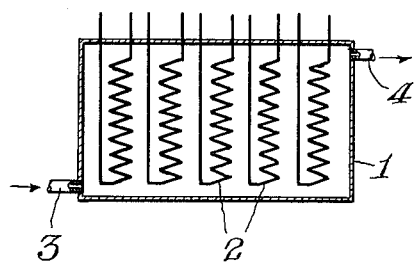
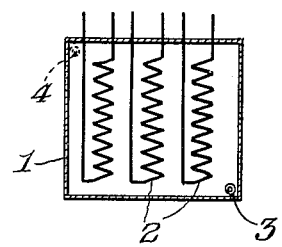
INVENTOR
Kuno Wagner
BY Connolly and Hutz
ATTORNEYS

United States Patent Office 3,162,240
Patented Dec. 22, 1964

3,162,240
PREPARATION OF HIGHLY PURIFIED
FORMALDEHYDE
Kuno Wagner, Leverkusen, Germany, assignor to Farbenfabriken Bayer Aktiengesellschaft, Leverkusen, Germany, a corporation of Germany
Filed May 17, 1961, Ser. No. 110,810
Claims priority, application Germany June 2, 1960
2 Claims. (Cl. 165—1)

The invention relates to the preparation of formaldehyde in a pure form that is substantially free from water and is suitable for the production of high molecular weight useful formaldehyde polymers referred to as polyoxymethylenes.

It is known to free formaldehyde from impurities such as water, methanol, methylal, formic acid and other substances by conducting it in the gaseous state at a high flow velocity through systems of uniformly cooled pipes. In this way it is partly polymerized with the formation of a solid product, the impurities being partly bound by the polymer and thereby removed from the formaldehyde vapors. In this process, the formaldehyde vapors are brought into contact for a relatively brief time with metal surfaces having areas as large as possible which act as catalysts of the polymerization of formaldehyde. In this process, however, not only low molecular weight polymers but also products having a relatively high molecular weight are formed, so that considerable quantities of formaldehyde are used up for binding the impurities, and consequently the yield of purified formaldehyde is reduced. Since, moreover, the polymers adhere to the walls of the pipes and obstruct the pipes, the systems have to be frequently shut down for cleaning. Finally, because of the high flow velocities required, a very high degree of purity cannot be obtained.

It has now been found that the above-mentioned disadvantages may be obviated, and highly purified formaldehyde may be obtained, if crude or unpurified formaldehyde vapors are allowed to flow with relatively long residence or contact period through chambers in which the ratio of contact surfaces to volumetric capacity is below 0.6 square centimeter per cubic centimeter, preferably below 0.25 square centimeter per cubic centimeter, and the formaldehyde vapors are made to pass repeatedly through zones with a temperature gradient inside these chambers. The residence or contact period of the formaldehyde vapors inside the chambers may be about 5–20 minutes, preferably 8–12 minutes. The boundary surfaces of the chambers themselves may be of rectangular or circular cross section. They are equipped with cooling or heating coils or other temperature-regulating devices, the temperatures of which may be so adjusted that a temperature gradient is produced between them and the ambient formaldehyde vapors. The process may be carried out with only a single chamber, in which case the temperature of the cooling devices is adjusted to about −20 to +15° C. When using several chambers arranged in succession, it is advisable to have the temperature of the cooling devices of the first chambers through which the formaldehyde flows higher than those of the last chambers. In the first chambers, the temperatures of the temperature-regulating devices may reach 100° C. The formaldehyde vapors are generally introduced at temperatures between 30 and 100° C. into the chambers, and the flow velocities in the inlet pipes may be about 500–4000 milliliters per second.

In accordance with the process of the present invention, it is possible in a simple manner to produce highly purified formaldehyde containing less than 0.05%, even less than 0.02% by weight of water, in a yield of 85%.

The high purifying effect of the present process may be attributed to the following factors:

(a) Of essential importance is the use of chambers having relatively small inner contact surfaces, composed of the boundary walls of the chambers and the surfaces of the temperature-regulating devices (plane surfaces, coils, ribs), compared with the volumetric capacity of these chambers. According to a preferred embodiment of the invention, this surface/volume ratio (measured in $cm.^2/cm.^3$) is below 0.25, for example 0.07 to 0.2, depending on whether the boundary surfaces of the chambers have a square, rectangular or circular cross section. In comparison with these values, surface/volume ratios between 2 and 4 square centimeters per cubic centimeter were used in previously known purification systems; the aim of this was to provide the most intensive heat exchange that is possible between the formaldehyde vapors and the contact surfaces and to have as large a surface area as possible available for the polymeriztion of formaldehyde. The very small surface to volume (surface/volume) ratios that are used in the process of the invention greatly suppress contact catalysis and thereby considerably reduce the amount of prepolymer that is formed. By using long residence periods in the chambers which have a small surface area, and a large number of zones with temperature gradients, concentration shifts and separating processes leading to the separation of the unwanted impurities may occur without significant interference by the catalytically acting surfaces.

(b) Another essential feature is the special type of temperature control inside the chambers, so that the formaldehyde vapors pass through temperature gradients. This and the low flow velocities inside the chambers provide particularly suitable conditions for the separation of the contaminating substances from the formaldehyde vapors.

(c) The efficiency of the process may, moreover, be influenced by the sharp change in flow velocity as the formaldehyde vapors leave the inlet pipe and enter the purification chambers. Whereas the flow velocities used for conducting the formaldehyde vapors into the chambers may lie between about 500 to 4000 milliliters per second, they generally drop to below 3 milliliters per second inside the chambers.

Two chambers connected in series and having rectangular walls of sheet steel whose dimensions are each 100 x 60 x 60 centimeters may, for example, be used for carrying out the process of the invention. Each chamber is provided with 15 cooling coils which project through and are held by the lid of each chamber. The length and diameter of each of these coils are 600 centimeters and 1 centimeter, respectively. The coils are disposed vertically inside, and extend nearly to the bottom of the chambers. In the first chamber, the heat exchangers are adjusted to temperatures above 0° C., for example by heating the coils alternately to temperatures between 70–130° C. on the one hand and 20–70° C. on the other. The temperatures are preferably so chosen that there are temperature differences between the individual heat exchangers of 20–50° C. For example, 9 coils disposed in three rows are kept at temperatures of 50–60° C., whereas the remaining six coils, which are arranged between the first mentioned coils, are kept at temperatures of 80–90° C., so that the temperature difference between the differentially heated coils is 30–40° C.

In the second chamber, the heat exchangers are preferably kept at temperatures below 0° C., for example −20 to −8° C., but temperatures up to about +15° C. may be used for formaldehyde vapors containing only a relatively small amount of impurities. It is also possible to carry out the process at temperatures below —20° C., but this has no advantages, since liquefaction of formaldehyde may occur below —21° C. The individual heat exchangers of the second chamber may, like those of the first chamber, be at different temperatures, but alternatively all the heat exchangers may be kept at the same temperature, for example —20° C., and if a stream of formaldehyde then enters at 40–50° C., temperatures of about —8° C. may be established between the heat exchangers.

The capacities of the chambers is about 0.35 cubic meter, the surface/volume ratio about 0.19 square centimeter per cubic centimeter. The chambers have an inlet pipe in one of the bottom corners and an outflow pipe in the diametrically opposite top corner, and the outlet pipe of one chamber is connected with the inlet pipe of the other.

The purification of formaldehyde by means of the apparatus described may be carried out as follows: Formaldehyde vapors containing approximately 3% water are introduced into the first chamber at a rate of about 42 liters per minute and at a temperature of 60–100° C., preferably 70–80° C., through the inlet pipe, which has a cross-sectional diameter of 2 cm. After staying in this chamber for about 9 minutes, the formaldehyde vapor flows through the outlet pipe into the second chamber, and stays there for about the same length of time before leaving at a rate of about 37 liters per minute. Formaldehyde which is practically free from water is obtained, the water content being less than 0.02%. The yield of formaldehyde is approximately 90% calculated on the formaldehyde initially added. Viscous to solid polyoxymethylene hydrates containing large amounts of water separate out in the lower zones of the first chamber during this process, whereas practically no deposits occur in the higher zones, particularly near the outlet. In the second chamber, very small quantities of low molecular products similar to paraformaldehyde are deposited at the bottom. The amount separated was less than 200 g. after about 16 kg. of formaldehyde gas had passed through the chamber.

Since the quantity of polymerization products formed in carrying out the present process is quite small and these products separate in the chambers in a form in which they do not hinder the passage of formaldehyde vapors, the chambers need to be cleaned only after relatively large intervals of time. This cleaning may be effected, for example, by forcing the prepolymers with superheated steam into solution in formalin which is then washed out of the chambers. In order to sustain a continuous process while the chambers are being cleaned, plants with two chamber systems may be used, these systems being arranged in parallel, only one system being used while the other is being cleaned. Formaldehyde purified by the present process contains less than 0.018% water, less than 0.004% formic acid and less than 0.002% methanol and can be used without further treatment for polymerization or other reactions for which formaldehyde of extreme purity is required.

The formaldehyde vapors required for carrying out the new process of the present invention may be produced in known manner. For example, low polymers of formaldehyde (e.g., paraformaldehyde or alpha-polyoxymethylene or contaminated trioxane containing traces of water) can be decomposed as such or with the aid of heat exchangers, for example, with inert organic substances, at elevated temperatures, for instance, at 120 to 130° C. The preferred inert organic substances are inert organic liquids which boil above 130° C. and belong to the aliphatic, cycloaliphatic, araliphatic or aromatic series; also suitable are compounds containing heteroatoms, for example, maleic acid anhydride, hexahydrophthalic acid anhydride, higher molecular weight polyesters and polycarbonates, polyethers and polythioethers, polyacetals having an average molecular weight of 2000 and others. The preferred method is to decompose the paraformaldehyde by pyrolysis, e.g., on rollers, in worms or rotary drums. Alternatively, one may start with the formaldehyde-containing gases which are obtained by the dehydrogenation of methanol (which may be carried through in the presence of air or oxygen) and remove, for example, methanol, water and other impurities by known processes of partial condensation at elevated pressure until the content of water is about 1 to 7%, preferably 3 to 5% by weight, and the vapors so obtained may be subjected to further purification by the process of the invention.

*Example 1*

14,000 parts by weight of formaldehyde containing 0.14% by weight of water are purified by the following process:

(a) Formaldehyde, in the form of vapor heated to 40–50° C., is conducted at a velocity of 40 liters per minute through a system of pipes which is cooled to —18 to —20° C. and which contains 144 pipes connected in parallel, each having a cross-sectional diameter of 1 cm. and a length of 100 cm. and a surface/volume ratio which is 4 square centimeters per cubic centimeter. The purified formaldehyde contains 0.046% water, but purification results in a loss in yield of 4800 parts by weight (about 34% of the amount of formaldehyde initially introduced) due to polymerization.

(b) Formaldehyde is conducted in the form of vapor through 50 liters of decalin at —18° to —20° C. The loss in yield is 3900 parts by weight; about 30% of the purified formaldehyde is polymerized.

(c) Formaldehyde is conducted in the form of vapor heated to 40–50° C. through one of the above-described chambers whose heating coils are cooled to —20° to —16° C. The formaldehyde vapors stay in this chamber for about 8.6 minutes, so that they assume temperatures of about —6 to —8° C. The purified formaldehyde vapor contains less than 0.02% water. The loss in yield due to polymerization is only 250 parts by weight (=1.8% of the formaldehyde originally introduced). The loss in yield in the present process (c) is thus considerably less and the degree of purity obtained considerably higher than in the processes (a and b) which have been used for comparison.

In the accompanying drawing, a chamber such as is used for carrying out the present process is represented schematically. FIG. 1 is a side view while FIG. 2 is a front view of the schematically represented chambers. In this drawing, the reference numeral 1 refers to walls of the chamber, 2 refers to heat exchangers, 3 refers to inlet pipes and 4 refers to outlet pipes for the formaldehyde vapors.

*Example 2*

20,000 parts by weight of paraformaldehyde having a water content of 3.5 percent by weight is purified as follows:

Formaldehyde vapors obtained by pyrolysis of paraformaldehyde that have been preheated to a temperature between 90 and 100° C. are passed through one of the above-described chambers at a velocity of about 41 liters per minute. Nine coils of the chamber are kept at a temperature of 60° C., while 6 coils—arranged in between the aforementioned coils—are heated to 80° C. The difference in temperature between the differently heated coils is 20° C. The vapors flowing from the first chamber are conducted through a second chamber, 9 coils of which are kept at a temperature of —20° C., while 6 coils arranged in between are cooled to about —10° C. The vapors stay in each chamber for about 11 minutes.

The purified formaldehyde after leaving the cooled chamber has a water content of less than 0.02 percent. Yield: 15,440 parts by weight=about 80 percent calculated on the formaldehyde content of the paraformaldehyde. In the first and second chambers there is obtained a total of 4,600 parts by weight (20 percent) of prepolymerisates which predominantly have a water content of 8 to 12 percent. In contrast wth Example 1(a) the purification of the formaldehyde vapors containing this large amount of water (3.5%) leads to prepolymerisates which amount to 60 to 65 percent of the amount of paraformaldehyde used; there are only obtained 40 to 35 percent of pure formaldehyde.

I claim:

1. A process for the production for formaldehyde having a high degree of purity and containing less than 0.02% by weight of water, less than 0.004% by weight of formic acid, and less than 0.002% by weight of methanol, from crude formaldehyde containing between about 1 and about 7% by weight of water, which comprises passing vapors of the said crude formaldehyde preheated to a temperature between about 30 and about 100° C. at an inlet flow rate of at least 500 milliliters per second into a series of chambers, the internal surfaces of which are maintained at a temperature gradient from not more than 130° C. at the inlet to approximately −20° C. at the outlet of the series, the ratio of the contact surface area to volume of the said series of chambers being not more than 0.6 square centimeter per cubic centimeter while maintaining the contact period of the formaldehyde vapors in the said series of chambers between about 5 and about 20 minutes.

2. A process as defined in claim 1 in which the ratio of the contact surface area to volume of the series of chambers is less than 0.25 square centimeter per cubic centimeter.

References Cited in the file of this patent

UNITED STATES PATENTS 3,027,651     Nerge _____ Apr. 3, 1962